United States Patent Office.

THE OKRA PAPER COMPANY, OF NEW YORK, N. Y., ASSIGNEES OF JOHN B. READ.

*Letters Patent No.* 51,571, *dated December* 26, 1865; *reissue No.* 3,907, *dated April* 5, 1870.

IMPROVEMENT IN THE MANUFACTURE OF PAPER.

The Schedule referred to in these Letters Patent and making part of the same.

*To all whom it may concern:*

Be it known that I, JOHN B. READ, of the town of Tuscaloosa, in the State of Alabama, have invented a new and useful Improvement in the Manufacture of Paper and *Papier-Maché*; and I do hereby declare that the following is a full, clear and exact descriptionthereof.

The application of various plants to the production of pulp for the manufacture of paper and *papier-maché* has for many years past commanded considerable attention, for the reason that it has become apparent that the consumption of paper and *papier-maché* was increasing beyond the increasing production of rags suitable for the purpose.

The desideratum has been to produce pulp suitable for the manufacture of paper and *papier-maché* at less cost than from rags, and as rags are worn textile fabrics, such as linen and cotton fabrics, those who have sought to obtain a cheaper substitute for rags have generally directed their attention to fiber-yielding plants, looking only to the fibrous portion of the plants as suitable for the purpose.

Straw, corn-husks, and such-like plants have been appplied to this purpose with varying degrees of success, but as these are in demand for other uses in the economy of like, the production of pulp from them is not so economical as was desired, and wood and other ligneous substances have finally been resorted to and are now used to some extent, but these, as well as the fiber-yielding plants, contain proximates which require powerful chemical agents to reduce them, and which, in reducing the proximates act upon and materially reduce the strength of the fibers.

I have discovered that the entire stalk of the okra plant, (*hibiscus esculentus*,) consisting of the fibrous and ligneous portions and pith, can be applied to the production of pulp suitable for the manufacture of paper and *papier-maché* of the various qualities suitable to the demands of the market, and that this plant also yields the matter suitable for sizing the paper.

And I have also discovered that this plant can be reduced to pulp by the same process required for the treatment of rags, without the necessity of resorting to the powerful chemical agencies required for the treatment of other plants heretofore applied to this purpose, although it can be treated for the production of good pulp by any of the processes which have been successfully applied to other plants.

To enable any one skilled in the art of making pulp for the manufacture of paper and *papier-maché*, I will describe the mode of treatment which I have practiced with success.

The stalks of the okra plant may be used for this purpose at any time after or just before maturity, but, by delaying the collection of them until after October, they will be more readily dried or cured and reduced.

The stalks are to be pulled up by the roots, or cut near the surface of the ground, and left to dry in the sun, and then stacked on end in the field for a few weeks; and, after being so cured, the stalks should be passed through a thrashing-machine, or otherwise treated, to separate the seeds, leaves, adhering soil, and any decayed portions, and then the stalks may be baled for transportation.

At the mill the stalks are to be broken by any of the well-known breaking-machines, and then boiled and in all respects treated as in the process of reducing rags to pulp, or by the process used for reducing straw.

I prefer to pass the stalks through a cutting-machine, such as used in paper-mills.

Pulp for making coarse paper can be produced from the okra plant by simply breaking the stalks, and working them in the beating-engine without either the boiling or alkaline treatment; but for making good strong paper and opaque paper, the stalks, after having been broken and cut, are to be boiled in water to dissolve the gum, which is to be separated either by permitting it to settle at the bottom of the boiler or by forcing it out by a press. The gum thus separated should be preserved to be afterward applied to size the paper.

One of the reasons for thus dwelling upon this separation of the natural gum of the okra is its admirable adaptation for sizing; it is believed to be fully equal to the best gelatine or animal sizing, and suited for the finest grades of writing-paper.

After the gum has been separated, the mass is to be boiled the proper number of hours, which is about twelve hours at eighty pounds pressure to the square inch, in milk of lime, but without soda, although soda may be used, and in that case somewhat less boiling will be requisite, but time may be saved in boiling, and better results secured in making fine paper by boiling under high pressure; or the stalks may be passed at once into the boiler without separating the gum, as the boiling just prescribed will destroy it.

When the natural gum is saved, it makes the best of sizing, but when destroyed, any of the ordinary materials will answer for that purpose.

After the mass is removed from the boiler, it is to be washed and made into half-stuff, just as rags would be, but the brown coloring matter is to be removed before the full amount of bleach is applied.

A weak solution of bleaching-powder or liquor, or of soda-ash, which may or may not be rendered caustic by quick-lime, will remove the most of the coloring matter, and steam introduced by a pipe into the washing or beating-engine will facilitate this operation by moderate heating or boiling.

After this is accomplished, then apply the full usual strength of bleaching-powder or liquor, or chlorine gas may be used for this purpose. The mass will then be ready for the finishing engine and the paper-machine.

It is proper to state here that good, strong paper can be made without separating or destroying the gum, but the paper in this case would be less opaque, and might run less readily upon the machine.

What I claim, and desire to secure by Letters Patent, is—

The preparation of pulp for the manufacture of paper or *papier-maché* from the okra plant, (*hibiscus esculentus*,) substantially as described, which is claimed as my discovery, and as constituting a new manufacture from a combination of matter or materials never before used for this purpose.

JOHN B. READ.

Witnesses:
WM. H. BISHOP,
A. J. DE LACEY.